April 10, 1956 C. N. WEILER 2,741,751

SOCKET CONTACT CLIP FOR DIRECT MOUNTING
ON PRINTED CIRCUIT PANELS AND THE LIKE

Filed Dec. 29, 1951

Inventor:
Charles N. Weiler,
by Claude A. Mott
His Attorney.

United States Patent Office 2,741,751
Patented Apr. 10, 1956

2,741,751

SOCKET CONTACT CLIP FOR DIRECT MOUNTING ON PRINTED CIRCUIT PANELS AND THE LIKE

Charles N. Weiler, Nahant, Mass., assignor to General Electric Company, a corporation of New York Application December 29, 1951, Serial No. 264,069

8 Claims. (Cl. 339—217)

Figures 1, 2, 3, 4, 5, 6:
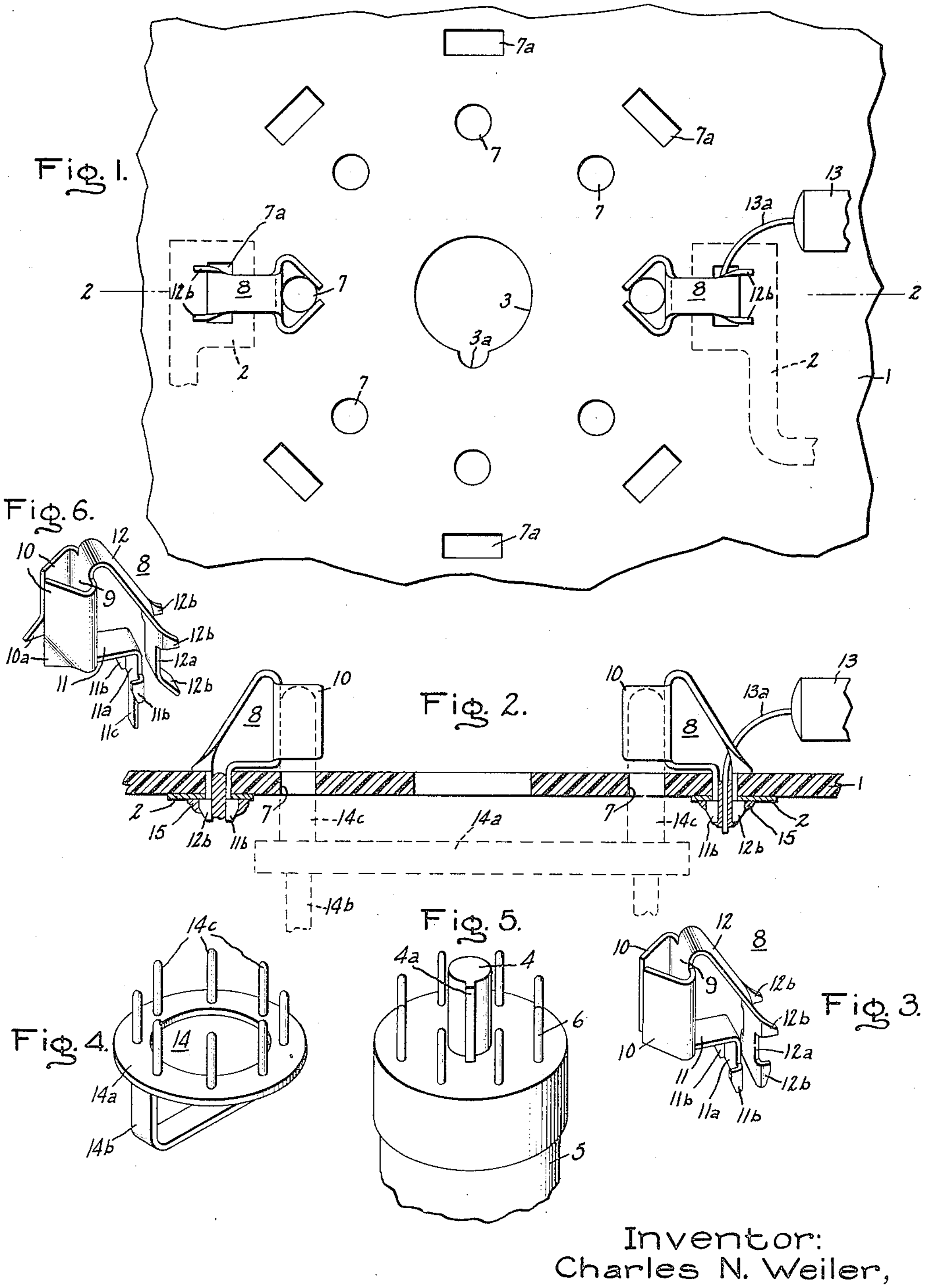

My invention relates to contact clips for direct mounting on printed circuit panels and the like, thereby to form directly on the panel mounting sockets for electron discharge tubes and other electric devices having extending terminal prongs.

My invention is particularly adapted for use in connection with electric apparatus of the "printed circuit" type, wherein a panel of non-conductive material is provided with a network of conductive strips integrally affixed to the panel in a predetermined circuit diagram. In such structures means must be provided for mounting and connecting other circuit components, such as fuses, transformers, potentiometers, capacitors, resistors, tube sockets and the like, to the printed circuit. Heretofore it has been a particularly expensive and time consuming operation to build onto a printed circuit panel a socket for an electron discharge tube or other electric device provided with a cluster of terminal prongs and to provide for connection of the socket terminals to printed circuit wiring and to other circuit components.

Accordingly, therefore, it is a general object of my invention to provide a new and improved contact clip for direct mounting upon a printed circuit panel, particularly in clusters to form sockets for pronged electric devices.

It is another object of my invention to provide such a direct mounted socket contact clip which is adapted to be readily and simultaneously connected electrically to printed circuit wiring and to other circuit components.

It is a further object of my invention to provide a new and improved socket for electrical devices having extending terminal prongs, which socket comprises a panel having affixed thereto a printed circuit and having mounted directly therein a cluster of contact clips connected to the printed circuit and together forming a socket for the pronged electric device.

In carrying out my invention in one form I provide a contact clip formed in one piece from a flat band or strip of resilient electric conducting material. The flat strip is bent into a ring-shaped configuration with its ends outturned and disposed in substantially parallel proximate spaced relation for movement toward and away from one another upon deformation of the ring-shaped strip. Intermediate the ends of the ring there is provided a flat portion having out-turned prong-engaging fingers forming a socket portion. Preferably the spaced ends of the ring extend in the direction of the socket axis and are radially and axially offset from the socket portion. The juxtaposed ends of the ring are provided on their mutually remote outside surfaces with lugs forming aligned notches arranged for resilient interlocking engagement in an aperture in the printed circuit panel. Each such contact clip is self supporting in the panel, so that by a single soldering operation the interlocked ends of a plurality of clips may be simultaneously soldered to adjacent printed circuit portions, as well as to one or more lead wires of other circuit components, such lead wires being inserted between the interlocked ends of a desired clip prior to soldering.

My invention will be more fully understood and its various objects and advantages further appreciated by referring now to the following detailed specification taken in conjunction with the accompanying drawing, in which Fig. 1 is a fragmentary plan view of a printed circuit panel showing mounted therein several socket contact clips embodying my invention in one form; Fig. 2 is a cross-sectional elevational view taken along the line 2—2 of Fig. 1 and including in dotted lines a locating jig positioned to align the several contact clips for soldering in fixed position to the printed circuit; Fig. 3 is a perspective view of a single socket contact clip of the type shown at Figs. 1 and 2; Fig. 4 is a perspective view of a jig suitable for positioning a cluster of clips for soldering; Fig. 5 is a fragmentary perspective view of an electron discharge tube or other electric device provided with a cluster of extending terminal prongs cooperable with the contact clips in the panel; and Fig. 6 is a view similar to Fig. 3 showing a contact clip embodying my invention in another form.

Referring now to the drawing, and more particularly to Figs. 1, 2, 3 and 5, I have illustrated a panel 1 formed of any suitable electric insulating material and provided on one side with a plurality of thin strips 2 of electric conducting material integrally affixed to the panel. Preferably the conductive strips 2 are fixed to the panel in accordance with a predetermined circuit diagram (not shown), and the circuit may be thus printed upon the panel by any one of a variety of well known techniques. For example, the printed circuit 2 may be formed by covering the surface of the panel with a stencil of suitable configuration and spraying the panel with conductive material prior to removal of the stencil. Alternatively the printed circuit may be applied to the panel 1 by well known photo-chemical processes similar to photo engraving, or by otherwise selectively etching a uniform layer of copper to leave the desired circuit pattern.

The panel 1 is provided with a central aligning aperture 3 having a key-way 3*a* for cooperation with the central post 4 and key 4*a* of an electron discharge tube 5 (Fig. 5). The discharge tube 5 of Fig. 5 is further provided with a cluster of extending terminal prongs 6 surrounding the central post 4. For cooperation with these terminal prongs the printed circuit panel 1 is provided with a cooperating cluster of prong receiving apertures 7 surrounding the central aperture 3. Adjacent each prong receiving aperture 7 of the panel 1 is a clip receiving aperture 7*a* of rectangular configuration. Adjacent each clip receiving aperture 7*a* is a desired conductor portion of the printed circuit 2. Only two of these conductor portions are shown in the drawing, but it will be understood by those skilled in the art that similar conductor portions may be provided for cooperation with each clip receiving aperture 7*a*. Preferably the clip receiving apertures 7*a*, pierce and are wholly surrounded by the associated printed circuit conductor portions 2.

Mounted in each clip receiving aperture 7*a* I provide a socket contact clip 8, preferred embodiments of which are illustrated in the drawing. Each socket contact clip is formed of a single integral piece of flat electric conducting material. Intermediate its ends the clip is formed with a flat side 9 having laterally extending therefrom a pair of wide in-turned resilient fingers 10 forming a split tubular prong-receiving socket portion. From opposite ends of the socket portion of the clip there extends a pair of resilient mounting arms 11 and 12 bent into a ring shape and having their ends 11*a* and 12*a* respectively, out-turned and disposed in substantially parallel proximate spaced relation for movement toward and away from one another upon bending of the arms. The outturned ends 11*a* and 12*a* extend in the direction of the axis of the socket portion of the clip and are radially and axially offset from the socket portion, the arm 11 being directly offset substantially perpendicular to the axis of the socket portion and the arm 12 being diagonally offset therefrom. The out-turned ends 11*a* and 12*a* of the spring clip are provided on their mutually remote outer faces with a plurality of lugs 11*b* and 12*b* which form therebetween a pair of aligned notches adapted for resilient interlocking engagement in the panel 1 in the manner illustrated at Fig. 2.

It will be evident from the foregoing that each socket contact clip 8 snaps into the panel 1 and is self supporting in interlocking engagement therewith. In forming a tube socket with a plurality of these clips, the clips are first loosely snapped into the clip receiving apertures 7*a* in such position that the prong receiving socket portions of the clip are disposed in alignment with the associated prong receiving apertures 7 in the panel 1. If it is desired to connect any particular contact clip to some circuit element other than the associated printed circuit portion 2, such as a resistor 13 (Fig. 2) having a lead wire 13*a*, the resistor is fixed in position with the lead wire 13*a* extending between the out-turned interlocked ends of the contact clips. With the cluster of clips thus loosely affixed in the panel 1 there is inserted in the prong receiving socket portions of the clips a suitable jig 14, such as that shown at Fig. 4, which accurately aligns the contact clips during the operation of fixedly mechanically and electrically connecting the clips to the panel and to the associated printed circuit portions. As shown at Fig. 4 the jig 14 comprises a ring-shaped base 14*a* having at one side a handle 14*b* and at the other side a cluster of pins 14*c* mounted upon the base 14*a* in the same relative positions as the pins 6 of the discharge tube 5. The aligning jig 14 is shown at Fig. 2 positioned in operative relation with the contact clips 8.

Preferably the contact clips 8 are rigidly connected to the panel 1 and connected electrically to the associated printed circuit portions 2 as well as to other desired circuit components such as the resistor 13 by the single operation of solder dipping the printed circuit side of the panel 1. For this operation the aligning jig 14 of Fig. 4 may be chromium plated, so that it will not accept any of the solder. The soldering operation fills the extending ends of each contact clip 8 with a body of solder 15, as shown at Fig. 2, and the solder bodies serve both rigidly and mechanically to fix the clips in the panel and to connect the clips electrically to the associated printed circuit portions 2. After withdrawal of the aligning jig 14, the panel is now prepared for insertion of the discharge device 5 into the socket formed by the socket contact portions of the cluster of contact clips 8.

At Fig. 6 I have illustrated a contact clip similar to that shown at Figs. 1–5 and embodying my invention in a slightly different form. The clip shown at Fig. 6, and all of its parts corresponding to like parts of the clip shown at Figs. 1–5, have been identified by the same reference numerals. At Fig. 6 the lower lugs 12*b* are formed as a single out-turned lug or ear 12*b* on the clip end 12*a*, and an elongated tail piece 11*c* depends from the clip end 11*a*. The extending tail 11*c* is useful to improve the soldering operation in that it serves to preheat the clip as the piece is dipped in the solder pot. At Fig. 6 I have also shown flared tips on the socket fingers 10 for the purpose of facilitating entrance of a tube prong.

While I have described for purposes of illustration preferred embodiments of my invention, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A contact clip for direct mounting upon a printed circuit panel at apertures therein to form sockets for pronged electric devices, said clip having a resilient prong-receiving contact socket portion, and a pair of resilient mounting arms extending from axially spaced apart points on said socket portion and having their ends juxtaposed in substantially parallel proximate spaced relation for movement toward and away from one another upon bending of said arms, said juxtaposed ends having on their mutually remote sides aligned notches adapted in accordance with the spacing of said ends for resilient interlocking engagement with the walls of a single aperture in the panel, whereby said contact clip may be rigidly fixed to said panel and simultaneously electrically connected to a printed circuit portion adjacent the aperture by soldering between said proximate ends within said aperture.

2. A contact clip for direct mounting upon a printed circuit panel at apertures therein to form sockets for pronged electric devices, said clip having a resilient prong receiving contact socket portion, and a pair of resilient mounting arms extending from axially spaced apart points on said socket portion and having their ends juxtaposed in substantially parallel proximate spaced relation for movement toward and away from one another upon bending of said arms, said juxtaposed ends extending axially of said socket portion and being radially offset therefrom and having on their mutually remote sides aligned notches adapted in accordance with the spacing of said ends for resilient interlocking engagement with the walls of a single aperture in the panel, whereby said contact clip may be electrically connected to a printed circuit portion adjacent the aperture and simultaneously rigidly mounted on said panel.

3. A contact clip for direct mounting upon a printed circuit panel at apertures therein to form sockets for pronged electric devices, said clip having a split tubular prong receiving socket portion, and a pair of resilient mounting arms extending from opposite ends of said tubular portion and having their ends juxtaposed in substantially parallel proximate spaced relation for movement toward and away from one another upon bending of said arms, said juxtaposed ends extending axially of said socket portion and being radially and axially offset therefrom and being provided on their mutually remote sides with aligned notches adapted in accordance with the spacing of said ends for resilient interlocking engagement with the walls of a single aperture in the panel, whereby said contact clip may be electrically connected to a printed circuit portion adjacent the aperture and simultaneously rigidly fixed to the panel.

4. A contact clip for direct mounting upon a printed circuit panel at apertures therein to form sockets for pronged electric devices, said clip having a split tubular prong receiving contact portion, a first resilient mounting arm extending perpendicularly from one end of said tubular portion and having its end disposed in radially and axially offset relation with respect to said tubular portion, and a second resilient mounting arm extending diagonally from the opposite end of said tubular portion and shaped to position its end in substantially parallel proximate spaced relation with the end of said first mounting arm for movement of said ends of said arms toward and away from one another upon bending of said arms, the spaced apart ends of said mounting arms being provided at their mutually remote sides with lugs forming aligned notches adapted in accordance with the spacing of said ends for resilient interlocking engagement with the walls of a single aperture in the panel, whereby said contact clip may be electrically connected to a printed circuit portion adjacent the aperture and simultaneously rigidly fixed to the panel.

5. A contact clip for direct mounting upon a printed circuit panel at apertures therein to form sockets for pronged electric devices, said clip having a ring-shaped band of resilient electric conducting material having outturned ends juxtaposed in flatwise proximate spaced relation for movement toward and away from one another upon deformation of said band and having intermediate said ends a flat portion provided with resilient prong-receiving contact fingers, said outturned ends being provided on mutually remote sides with opposed notches aligned and adapted in accordance with the spacing of said ends for resilient interlocking engagement with the walls of a single aperture in the panel, whereby said contact may be electrically connected by soldering to a printed circuit portion adjacent the aperture and simultaneously rigidly fixed to the panel.

6. A contact clip for direct mounting upon a printed circuit panel at apertures therein to form sockets for pronged electric devices, said clip having an integral ring-shaped band of resilient electric conducting material having out-turned ends juxtaposed in flatwise substantially parallel proximate spaced relation for movement toward and away from one another upon deformation of said band and having intermediate said ends resilient prong-receiving fingers extending laterally therefrom to form a split tubular contact socket portion, the axis of said socket portion extending in the direction of and being offset with respect to said out-turned ends, and a plurality of lugs on said out-turned ends forming on the mutually remote faces thereof aligned notches adapted in accordance with the spacing of said ends for resilient interlocking engagement with the walls of a single aperture in the panel, whereby said contact clip may be rigidly mechanically fixed to the panel and simultaneously directly electrically connected to a printed circuit portion adjacent the aperture by soldering of said out-turned ends to such printed circuit portion.

7. In a socket for directly mounting an electric device having terminal prongs upon a printed circuit panel, a non-conductive mounting panel having integrally fixed thereto a plurality of strips of electric conducting material in a predetermined circuit pattern, said panel being provided with a cluster of mounting apertures piercing certain of said conductive strips, and a plurality of contact clips mounted in said apertures in cooperative supporting relation with the terminal prongs of an electric device, each said clip comprising a resilient contact socket portion disposed with its axis perpendicular to said panel and a pair of resilient mounting arms extending from opposite ends of said socket portion and having their ends juxtaposed in substantially parallel proximate spaced relation in one of said apertures, said ends of said mounting arms being provided with lugs forming on mutually remote sides of said arms aligned notches disposed in accordance with the spacing of said ends for resilient interlocking engagement with said panel, and a body of solder rigidly mechanically fixing each said clip in its associated aperture and directly electrically connecting certain of said clips to the contact strips pierced by certain of said apertures.

8. In an apparatus for connecting the terminal prongs of an electric device with associated circuit elements and simultaneously mounting said device, a panel having a plurality of conductive strips integrally attached thereto in a predetermined circuit pattern and having a plurality of apertures disposed in complementary offset relation with the terminal prongs of such device, at least some of said apertures being adjacent selected conductive strips, and a plurality of conductive contact clips mounted in said apertures and having prong-receiving socket portions disposed to receive said terminal prongs, each of said clips having a pair of resilient mounting arms extending from axially spaced apart points on its said socket portion and having their ends juxtaposed in substantially parallel spaced relation in resilient interlocking engagement with one of said apertures in which it is positioned by lugs formed on mutually remote sides of said arms, and certain of said clips being electrically connected to said selected conductive strips.

References Cited in the file of this patent

UNITED STATES PATENTS

| | | |
|---|---|---|
| 2,033,765 | Franke | Mar. 10, 1936 |
| 2,149,084 | Cook | Feb. 28, 1939 |
| 2,320,871 | Keith | June 1, 1943 |
| 2,519,121 | Del Camp | Aug. 15, 1950 |
| 2,524,939 | Stephan | Oct. 10, 1950 |
| 2,533,483 | Losquadro | Dec. 12, 1950 |
| 2,560,211 | Burdick | July 10, 1951 |
| 2,595,188 | Del Camp | Apr. 29, 1952 |
| 2,613,244 | Del Camp | Oct. 7, 1952 |
| 2,615,950 | Lamb | Oct. 28, 1952 |
| 2,631,184 | Sampson | Mar. 10, 1953 |